Patented Apr. 29, 1924.

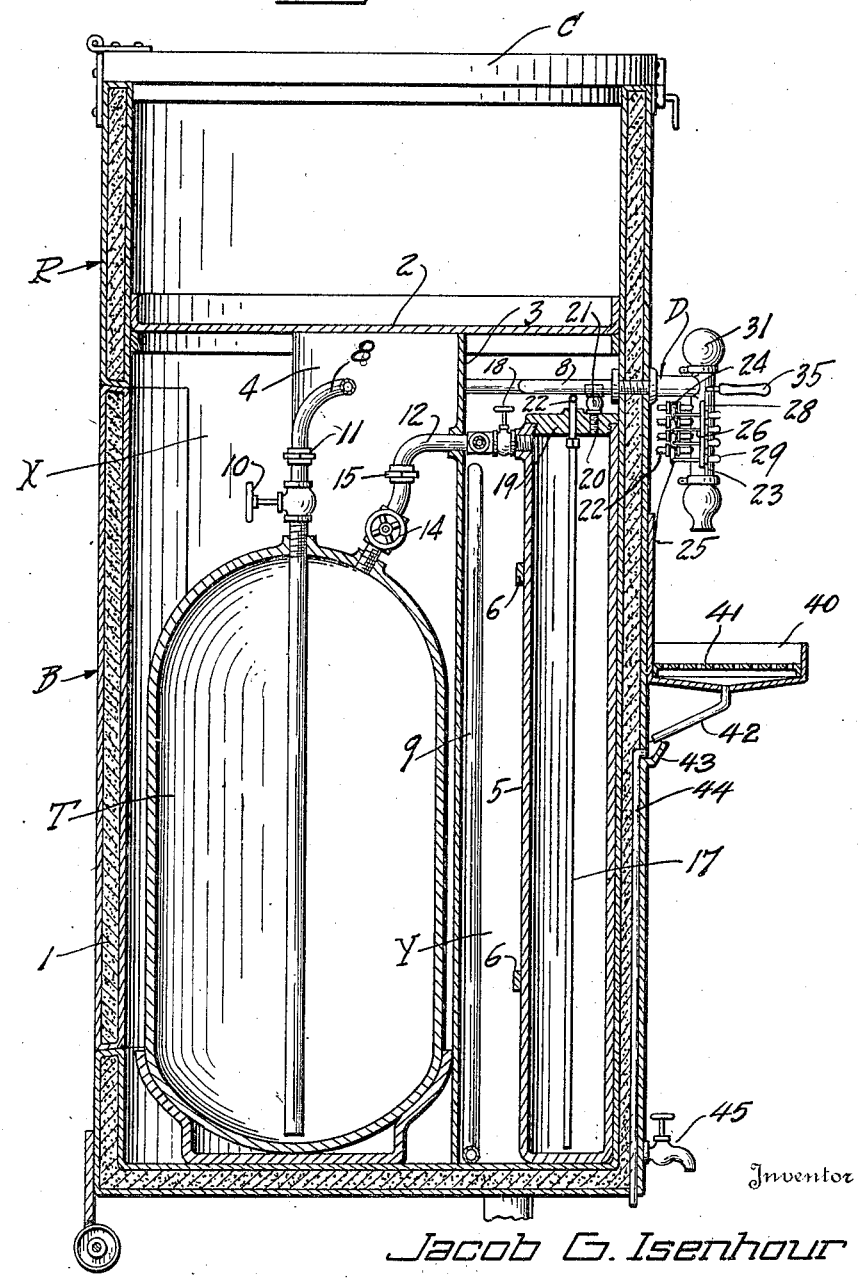

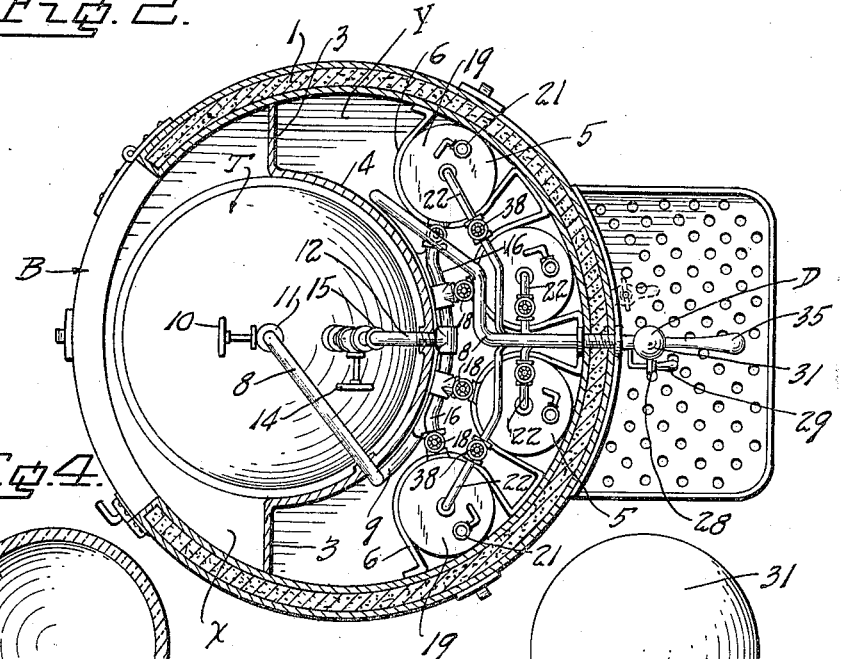
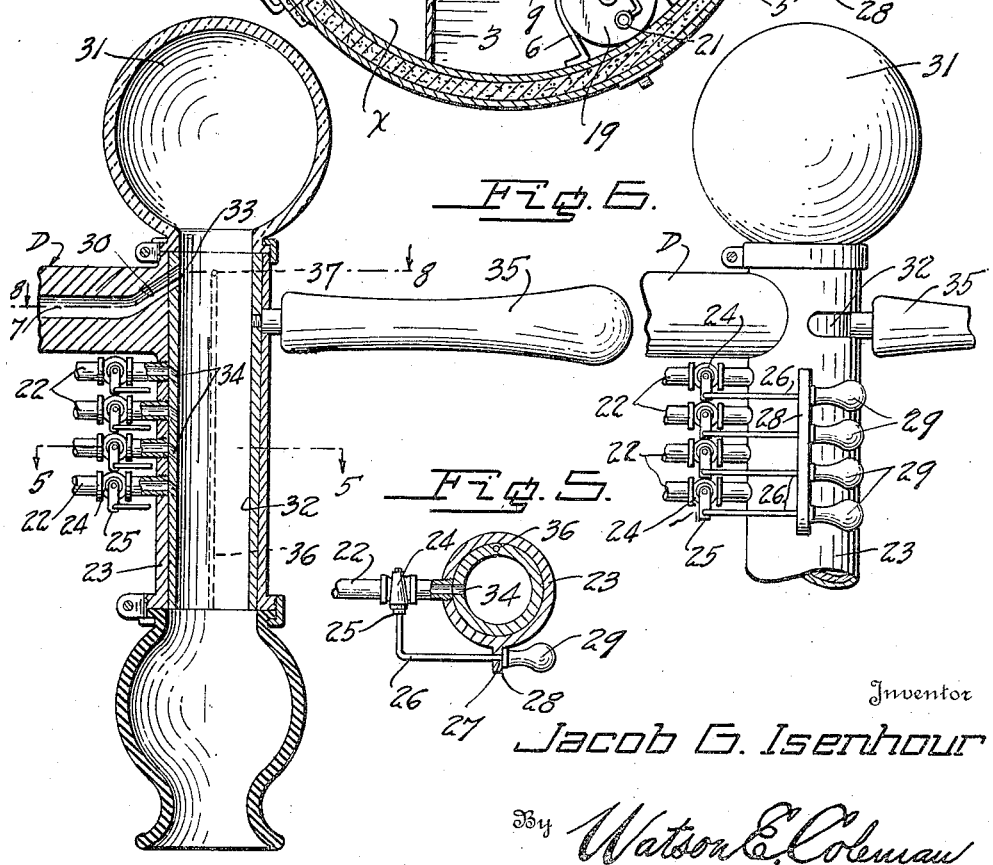

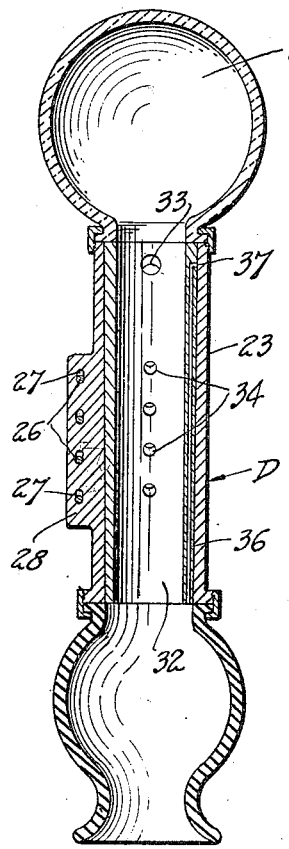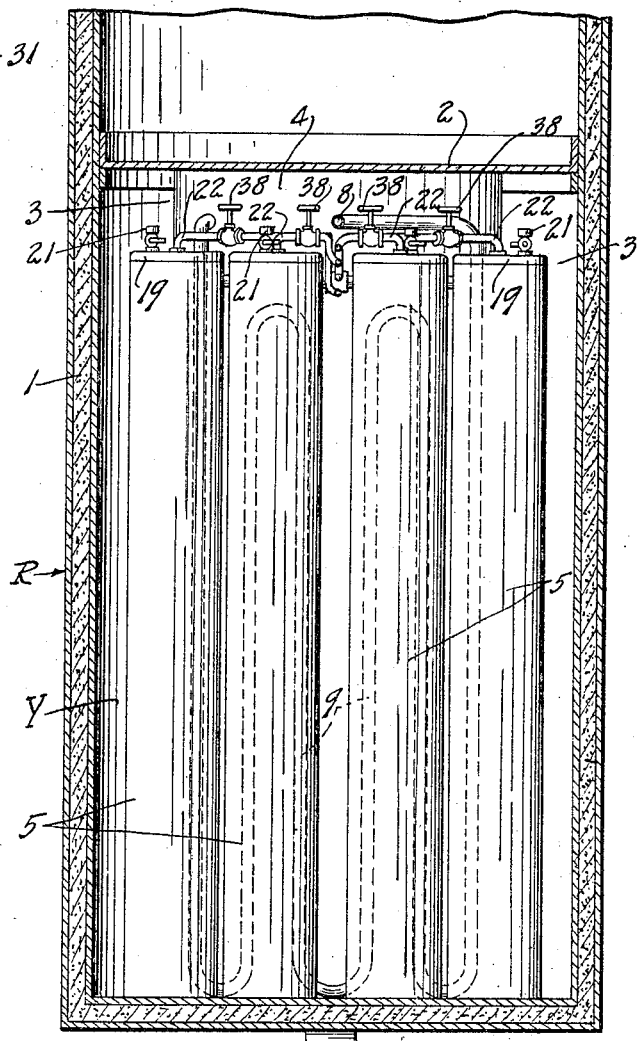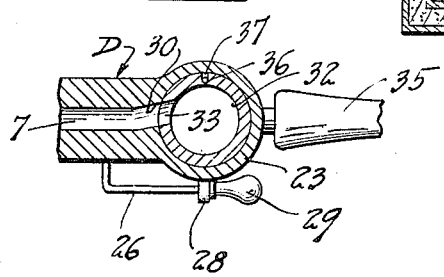

1,492,463

UNITED STATES PATENT OFFICE.

JACOB G. ISENHOUR, OF WINSTON-SALEM, NORTH CAROLINA.

DISPENSING APPARATUS.

Application filed September 5, 1922. Serial No. 586,249.

*To all whom it may concern:*

Be it known that JACOB G. ISENHOUR, a citizen of the United States, residing at Winston-Salem, in the county of Forsyth and State of North Carolina, has invented certain new and useful Improvements in Dispensing Apparatus, of which the following is a specification, reference being had to the accompanying drawings.

This invention relates to certain improvements in dispensing apparatus and has relation more particularly to a device of this general character especially designed and adapted for use in connection with beverages and it is primarily an object of the invention to provide an apparatus of this general character wherein is employed a draft arm in communication with a source of gas charged liquid which also is in communication with a source of flavoring or syrup.

It is also an object of the invention to provide a novel and improved apparatus of this general character comprising a draft arm in communication with a source of liquid under pressure and also in communication with a flavoring syrup or the like under pressure, the draft arm including a valve controlling the discharge therefrom of both the liquid and syrup.

Another object of the invention is to provide a novel and improved device of this general character comprising a draft arm together with means associated therewith whereby both liquid and flavoring syrup or the like may be discharged from the draft arm at a relatively low temperature and in a manner whereby a constant or fixed temperature of the liquid and the flavoring syrup is assured without any undue or special attention on the part of the dispenser or attendant.

An additional object of the invention is to provide an apparatus of this general character including a draft arm in communication with a source of liquid supply and with a source of flavoring syrup or the like and wherein said draft arm is provided with means to eliminate the foaming or frothing of the liquid or mixture discharged therefrom and without effecting the charge of the liquid which is preferably carbonated water.

The invention consists in the details of construction and in the combination and arrangement of the several parts of my improved dispensing apparatus whereby certain important advantages are attained and the device rendered simpler, less expensive, and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a vertical sectional view taken through a dispensing apparatus constructed in accordance with an embodiment of my invention;

Figure 2 is a view partly in top plan and partly in section of the apparatus as illustrated in Figure 1;

Figure 3 is a view partly in section and partly in elevation of the apparatus as herein comprised, a portion of the delivery pipe for the liquid being indicated by dotted lines;

Figure 4 is an enlarged fragmentary view partly in section and partly in elevation of the draft arm as herein disclosed;

Figure 5 is a detail sectional view taken substantially on the line 5—5 of Figure 4;

Figure 6 is a fragmentary view in elevation of the draft arm and particularly illustrating the means for controlling the discharge within said arm of the flavoring syrup or the like;

Figure 7 is a vertical sectional view taken through the draft arm, the line of section being substantially at right angle to the line of section of Figure 4; and Figure 8 is a fragmentary sectional view taken substantially on the line 8—8 of Figure 4.

As disclosed in the accompanying drawings, R denotes a receptacle of requisite dimensions and which is preferably cylindrical with its upper end open and adapted to be closed by the cover or lid C. The walls of the receptacle R are of conventional construction including the insulation 1, said insulation being of cork or the like as is generally employed in connection with refrigerating apparatus or devices. The upper portion of the receptacle R is adapted to have seated therein a tray 2 or the like which is adapted to have rested thereon any articles it is desired to preserve.

The lower portion of the receptacle R is provided in a wall thereof with a door B to permit ready and convenient access within the receptacle and particularly to permit the insertion or removal of a tank T, said tank being of the well known type for containing carbonated or other gas charged liquid. The tank T is arranged within a chamber X which is provided by the vertically disposed wall 3 intersecting the interior of the receptacle R, the intermediate portion of said wall 3 being concavo-convex in cross section as at 4 to receive a portion of the tank T.

The second chamber Y within the receptacle R has positioned therein a series of containers 5, each of said containers being of relatively large capacity and which are held in applied position in any desired manner but preferably through the instrumentality of the holding straps 6 straddling said containers with the extremities of the straps suitably secured to the wall of the receptacle R. The containers 5 are adapted to hold a supply of flavoring syrup or the like which are preferably of different flavors.

D denotes a draft arm extending through the wall of the receptacle R and having its bore 7 continued by the pipe 8 which is in communication in a well known manner with the tank T, an intermediate portion of the pipe 8 being arranged in a vertically disposed coil 9 positioned in the chamber Y.

The purpose of the coil 9 is to assure the proper cooling of the liquid or water as delivered from the tank T and which cooling is accomplished in view of the fact that the chamber Y is adapted to be packed with ice, such packing also serving to properly cool the flavoring syrup or the like within the containers 5. This cooling of both the liquid or water from the tank T and the syrup or the like within the containers 5 is of decided advantage as it is assured that the beverage as discharged from the draft arm D will be of a desired low degree of temperature and it will further be assured that the flavoring syrup or the like will be of such temperature as not to reduce the temperature of the liquid taken from the tank T. This icing of the chamber Y is also of particular advantage as it eliminates the necessity of the operator or attendant placing ice in the cups in which the beverage may be served which results in a material saving in time and expense together with the elimination of the usual sloppy and uncleanly conditions which generally prevail under circumstances requiring the ice to be placed in the cups in which the beverage is to be served.

Interposed in the pipe 8 is a controlling valve 10 and also the coupling 11. By this means the tank T may be readily applied or removed when the occasions of practice so necessitate.

In communication with and leading from the upper portion of the tank T is a pipe 12 which also has interposed therein a controlling valve 14 and coupling 15 to assure the proper application or removal of the tank T within the chamber X. The pipe 12 comprises the branches 16, each of said branches being in communication with the upper portion of a tank 5 so that requisite pressure will be produced in said tank to assure the proper discharge of the flavoring syrup or the like therein through the feed pipe 17. The feed pipe 17 for each of the containers 5 extends within said container through the top thereof and terminates at a point closely adjacent to the bottom of the container. Interposed in each of the branches 16 is a controlling valve 18.

The top head 19 of each of the containers is provided with a filling vent 20 normally closed by the valve 21 or the like.

Each of the feed pipes 17 is continued by a pipe line 22 which extends exteriorly of the receptacle R and is in communication with a vertically disposed or depending head 23 of the draft arm D. As is illustrated in Figures 4 and 6 of the accompanying drawings, the pipes 22 at their points of communication with the head 23 are spaced longitudinally and in a manner whereby the controlling valve 24 associated with each of the pipes 22 may be independently operated.

The valves 24 may be operated in any desired manner but as herein disclosed I have the stem of each of the valves 24 provided with a rock arm 25 with which is engaged a rod 26, said rod being slidably disposed through an opening 27 in an outstanding guide flange 28 carried by the head 23. Each of the rods 26 terminates in an operating handle 29 which, when the valve 24 is closed abuts the valve 28 so that no particular skill is required of the attendant or operator to effect the requisite operation of my improved apparatus.

The portion of the bore 7 of the draft arm D immediately adjacent the head 23 is disposed on an upward incline as at 30 so that the water or liquid delivered therefrom will be discharged upwardly within the chamber 31 with which the upper portion of the head 23 communicates. The chamber 31, as herein disclosed, is comprised within a spherical body preferably of glass and held in applied position in any desired manner. The portion 30 of the bore 7 of the arm D is also disposed on a lateral incline of a desired degree as is illustrated in Figure 8. The portion 30 of the bore 7 assures liquid as taken from the tank T to have a whirling or spiral action within the chamber 31 to such an extent that before the liquid is discharged through the head 23 the force of the liquid is substantially spent with the result as the beverage is received within a cup or the like, possibility of frothing, foaming or agitation of the liquid is substantially eliminated if not entirely dispensed with.

Arranged within the head 23 is a tubular rotary valve 32 which is provided with a port 33 for register with the portion 30 of the bore 7 of the arm D and with the ports 34 for register with the pipes 22, said ports 34 being downwardly disposed so that as the flavoring syrup or the like is discharged therethrough said syrup or the like will be prevented from being received within the chamber 31.

The ports 33 and 34 are so proportioned that the discharge of the liquid through the port 33 is five times as great as the flow of syrup through any one of the ports 34. By having this fixed relative flow it is assured that the portion of the beverage as received within the cup or the like will at all times be constant. This is a feature of decided importance in the dispensing of beverages as it is essential that the mixture be uniform.

The valve 32 is operated in any ordinary or preferred manner as by the handle 35 and it is to be noted that the ports 33 and 34 are in such relative arrangement as to assure the same being opened or closed substantially in unison so that the requisite delivery of the flavoring syrup or the like together with the liquid from within the tank T is accomplished simultaneously.

When the liquid from the tank T is delivered through the head 23 from the chamber 1 it is substantially quiescent but it is sometimes required that a beverage be effervescent and for this purpose the wall of the valve 32 is provided with the fine stream port 36 open at the lower edge of the valve and also opening through the side of the valve as at 37. This upper portion 37 of the port 36 upon proper rotation of the valve 33 is adapted to register with a portion 30 of the bore 7 of the arm D and in which event the liquid from within the tank T will be discharged in a fine stream through the port 36 and will be first received within the chamber 31.

Interposed in each of the pipes 22 at a point in relatively close proximity to its container 5 is the controlling valve 38. This valve 38 is particularly adapted for use in getting the requisite regulation of the flow of the flavoring syrup or the like from within a container 5 through its associated pipe 22.

It is to be noted that the tray 2 or the like when applied effectively closes the upper ends of the compartments X and Y so that in opening the cover or lid C for access within the upper portion of the receptacle no material effect will be had upon the temperature within the compartments X and Y.

By having the containers 5 in communication with the tank T it is to be noted that the pressure within the containers 5 will be equal to the pressure within the tank T whereby it is assured that the requisite discharge of the carbonated or other liquid under pressure and the flavoring syrup or the like will be in desired proportions.

In packing the chamber Y with ice it is only necessary to raise the cover or lid C and to remove the tray 2. At this time the ice may be readily packed within the chamber Y through the upper open end thereof.

While it is not essential, I have illustrated a tray 40 which is located on the casing beneath the discharge member 23 and within this tray is a perforated plate 41 which serves to support the cup or glass to be filled and which, on account of its being perforated, permits any spilled liquid to pass through and be discharged through an outlet pipe 42 into a cup 43 on the housing, from which cup leads a discharge pipe 44. At the lower portion of the casing is a valve or cock 45 for drawing off the water which accumulates as the ice melts.

From the foregoing description it is thought to be obvious that a dispensing apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice except as hereinafter claimed.

I claim:

1. In a dispensing device, a draft arm terminating in a cylindrical bearing portion and having a passage leading into the bearing portion, a sleeve valve rotatable within said bearing portion and formed with a port adapted to register with said passage, and a spherical shell carried by the upper end of said bearing portion and communicating with the sleeve, said passage having its outlet end inclined upwardly and laterally with respect to the center of the sleeve whereby to discharge fluid across the valve in a chordal and upward direction into said shell.

2. In a dispensing apparatus, a draft arm having a top swirling chamber and a lower valve casing, a valve, and ports in the valve casing and valve to direct fluid across the valve in a non-radial and upward direction to the bottom of the swirling chamber.

3. In a dispensing apparatus, a draft arm having a top swirling chamber and a lower valve casing, a rotary valve in said casing, a passage in the draft arm and a port in the valve adapted to register therewith, said passage having its discharge end inclined laterally with respect to the longitudinal axis of the valve and inclined upwardly for directing fluid in an upward and non-radial direction into the bottom of the swirling chamber.

4. In a dispensing apparatus, a draft arm having a top swirling chamber and a lower valve casing, a rotary valve in said casing, a passage in the draft arm and a port in the valve adapted to register therewith, said passage having its discharge end inclined laterally with respect to the longitudinal axis of the valve and inclined upwardly for directing fluid in an upward and non-radial direction into the bottom of the swirling chamber, the valve being further formed with a second port adapted to be brought into registration with said passage and communicating with a duct in the wall of the valve.

5. In a dispensing apparatus, a draft arm having a top swirling chamber and a lower valve casing, a hollow valve rotatable in the casing, a passage in the arm inclined upwardly and laterally with respect to the longitudinal axis of the valve and directed toward the bottom of the swirling chamber, whereby the liquid discharged may expend its force in said chamber and pass through the valve in a quiescent condition, and a duct in the wall of the valve leading from the bottom thereof to a point near the top and terminating in a port adapted to be brought into registration with said passage for directing downwardly a highly charged jet to produce effervescence in the previously discharged quiescent liquid.

In testimony whereof I hereunto affix my signature.

JACOB G. ISENHOUR.